United States Patent [19]

Minghetti

[11] Patent Number: 5,458,479

[45] Date of Patent: Oct. 17, 1995

[54] MACHINE FOR THE THERMOFORMING OF CONTAINERS OR SIMILAR HOLLOW BODIES MADE FROM THERMOPLASTIC MATERIAL

[75] Inventor: Moreno Minghetti, Bologna, Italy

[73] Assignee: Techne S.p.A., Bologna, Italy

[21] Appl. No.: 148,854

[22] Filed: Nov. 8, 1993

[30] Foreign Application Priority Data

Nov. 13, 1992 [IT] Italy .................................. BO92A0408

[51] Int. Cl.$^6$ .................................................. B29C 49/24
[52] U.S. Cl. ........................... 425/503; 264/509; 425/504
[58] Field of Search ..................................... 425/503, 504; 264/509

[56] References Cited

U.S. PATENT DOCUMENTS

| | | | |
|---|---|---|---|
| 4,834,641 | 5/1989 | Keyser | 425/503 |
| 5,198,247 | 3/1993 | Bartimes | 425/503 |

*Primary Examiner*—Tim Heitbrink
*Attorney, Agent, or Firm*—Larson & Taylor

[57] ABSTRACT

There are mounted on the carriage (2) which moves alternately between station (4) where the parisons (T) of thermoplastic material and the blowing station (5), two adjacent pairs of moulds (S) with their corresponding means of self-centering opening and closing. The containers (Z) coming from the two scrap-removal stations are taken by a single transverse discharging conveyor (34). The magazines that feed the labels to each pair of moulds are all positioned on the external near side of the machine, where the magazines are aligned in two parallel rows (35-135) and positioned at different levels so that they can easily be inspected and refilled with labels. The labels (E1–E2) are arranged differently in the two rows of magazines, and the label grasping and transferring devices (36-136-37-137-38) slaved to each pair of moulds are designed to take the labels from the two rows of magazines and then change their relative position and arrange these labels in a mutually adjacent position facing each other and the right way up, as necessary for their introduction into the cavities of the pairs of moulds.

6 Claims, 11 Drawing Sheets

MACHINE FOR THE THERMOFORMING OF CONTAINERS OR SIMILAR HOLLOW BODIES MADE FROM THERMOPLASTIC MATERIAL

BACKGROUND AND SUMMARY OF THE INVENTION

The invention relates to a machine for the blow thermoforming of bottles, containers and, more generally, hollow articles, in thermoplastic material, characterized by a high output, a relatively simplified construction, limited floor-space requirements and high technological reliability. The machine according to the invention is distinguished from conventional machines by the fact that it is provided, on the same carriage which moves alternately between the blowing station and the dual-purpose station where the labels are fed and the parisons of thermoplastic material coming from the extrusion head are loaded, with two adjacent pairs of male and female mould halves, hereinafter referred to more simply as moulds, which close and open with a self-centring movement. The containers coming from the scrap-removal stations are conveyed along a single transverse discharging line. The magazines containing the labels for insertion into the thermoforming moulds are located on opposite sides of the machine in a convenient position for inspection and for periodical refilling with labels.

BRIEF DESCRIPTION OF THE DRAWINGS

The features of the machine and its accompanying advantages will be clear from the following description of a preferred embodiment illustrated purely by way of a non-restrictive example in the figures of the nine accompanying sheets of drawings, in which.

DESCRIPTION OF THE PREFERRED EMBODIMENT OF THE INVENTION

Figure 1:
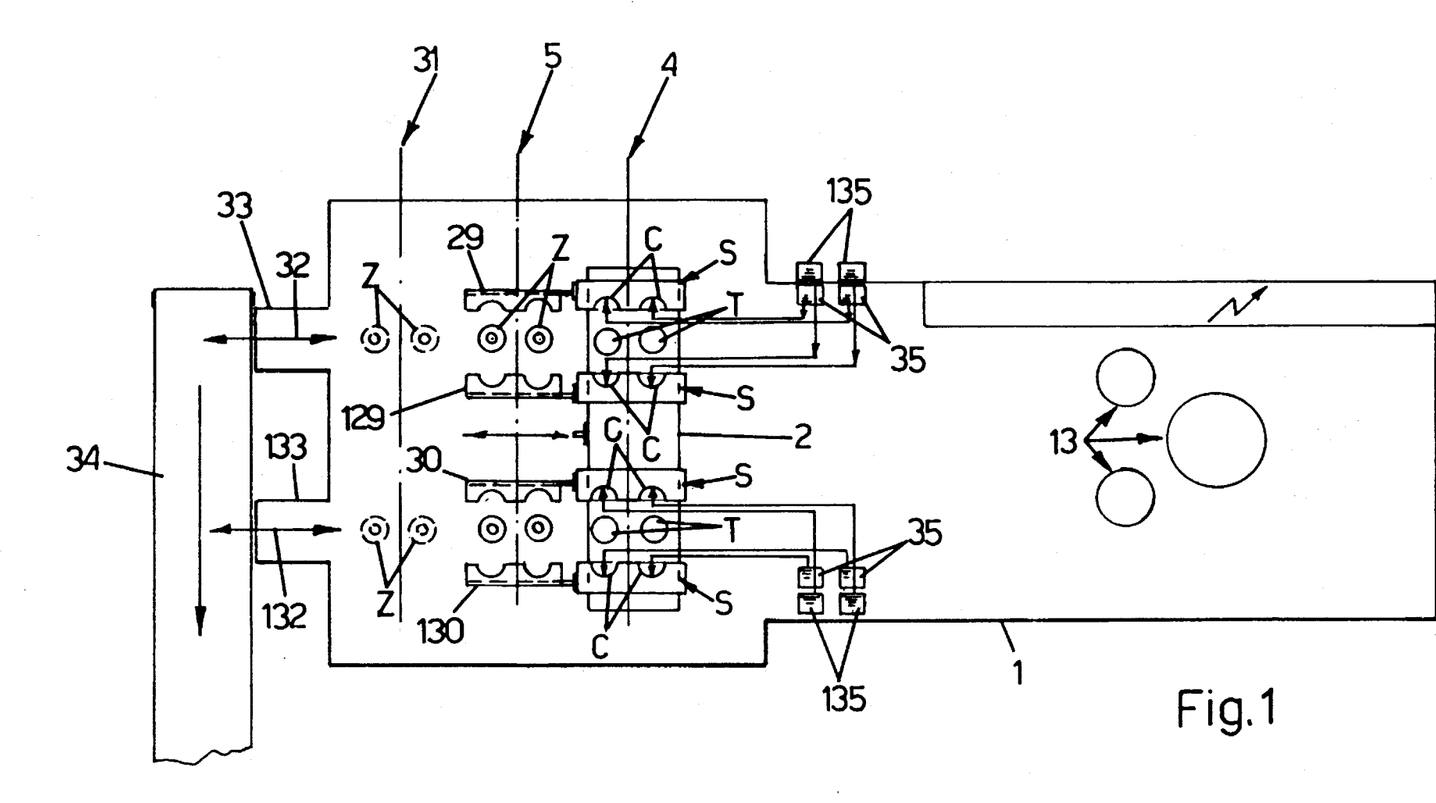
FIG. 1 is a diagrammatic plan view of the machine.
Figure 2:
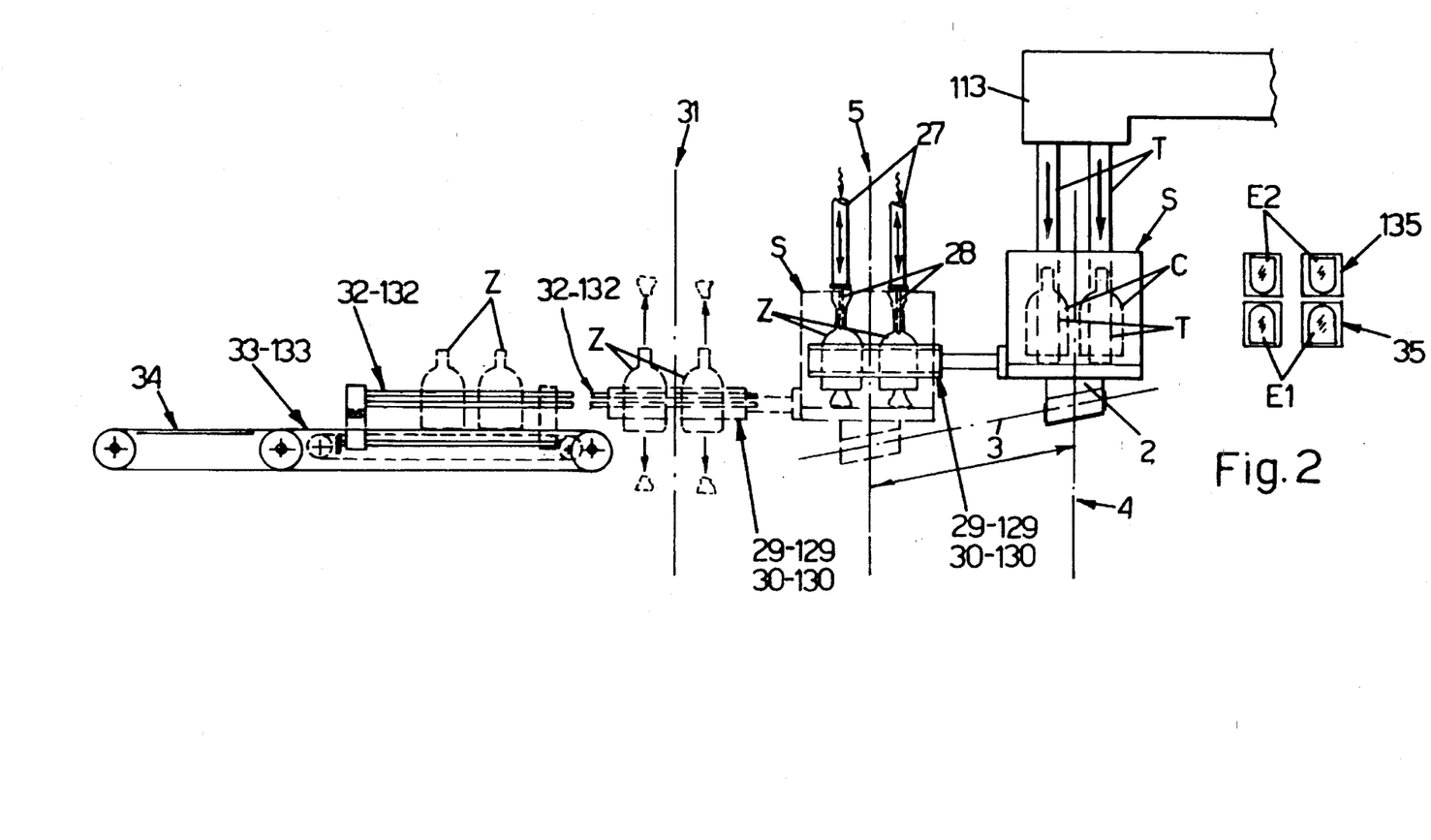
FIG. 2 diagrammatically illustrates the machine in a side elevation.
Figure 5:
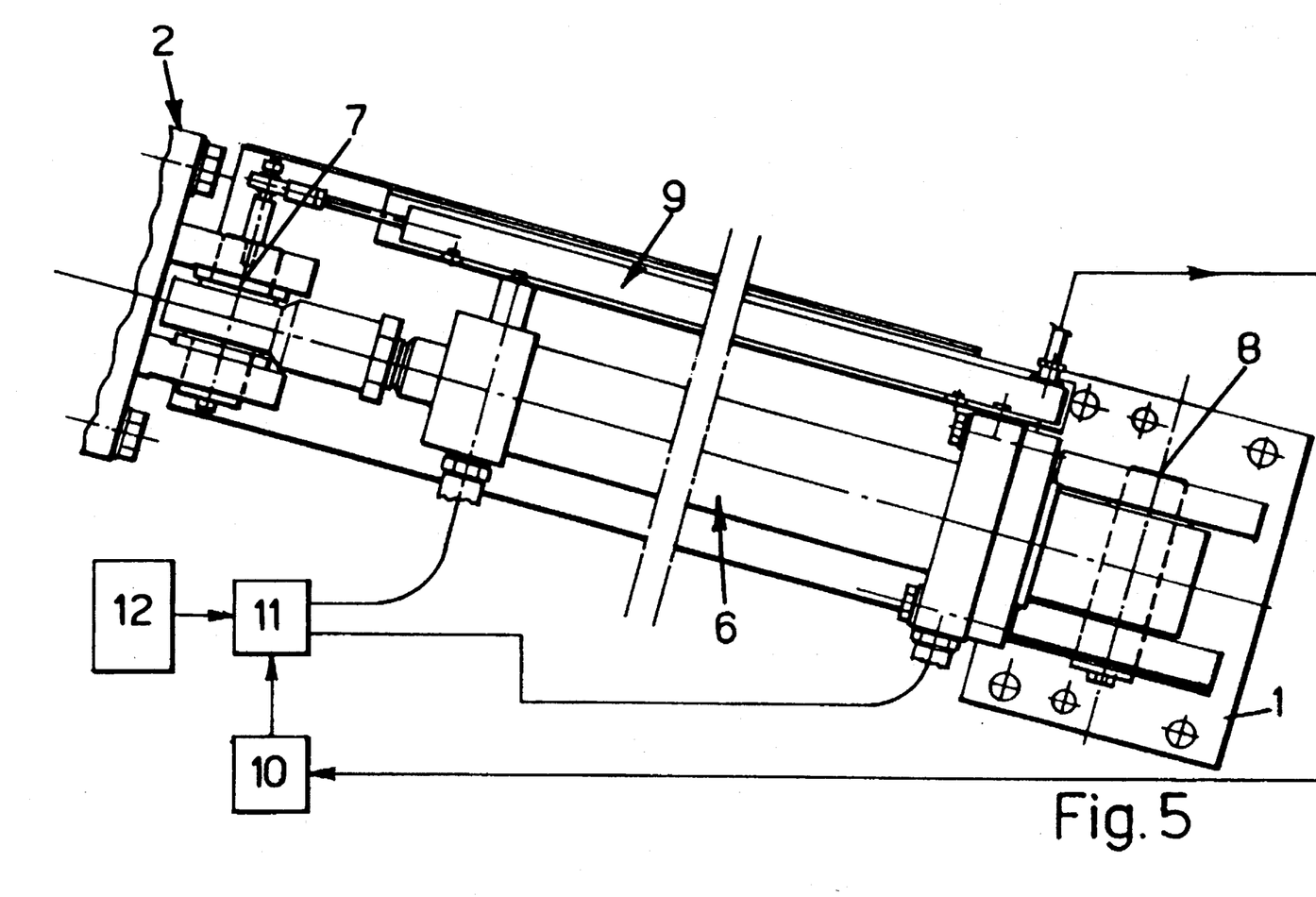
FIG. 5 is a plan view of the electro-hydraulic apparatus for the rapid and controlled movement of the carriage with the thermoforming moulds.

It can be seen from FIGS. 1 and 2 that the machine comprises, on a single base 1, a carriage 2 which is moved back and forth by special means on a pair of oblique parallel guides 3 for alternate positioning in stations 4 and 5 (see below). It can be seen in FIG. 5 that the carriage 2 is driven by a double-acting cylinder-and-piston unit 6 powered by fluid pressure and attached at 7 to the carriage and at 8 to the base 1 of the machine, there being connected to this unit 6 a linear transducer 9 which generates an electrical signal proportional to the displacement and speed of displacement of the carriage 2. The electrical signal produced by the transducer 9 is processed by a microprocessor 10 which controls the operation of the valve unit 11 connected on the one hand to the central hydraulic unit 12 and on the other to the unit 6, and which is set up to permit the carriage to be driven at a high speed with appropriate deceleration at the end of its travel.

Figure 3:
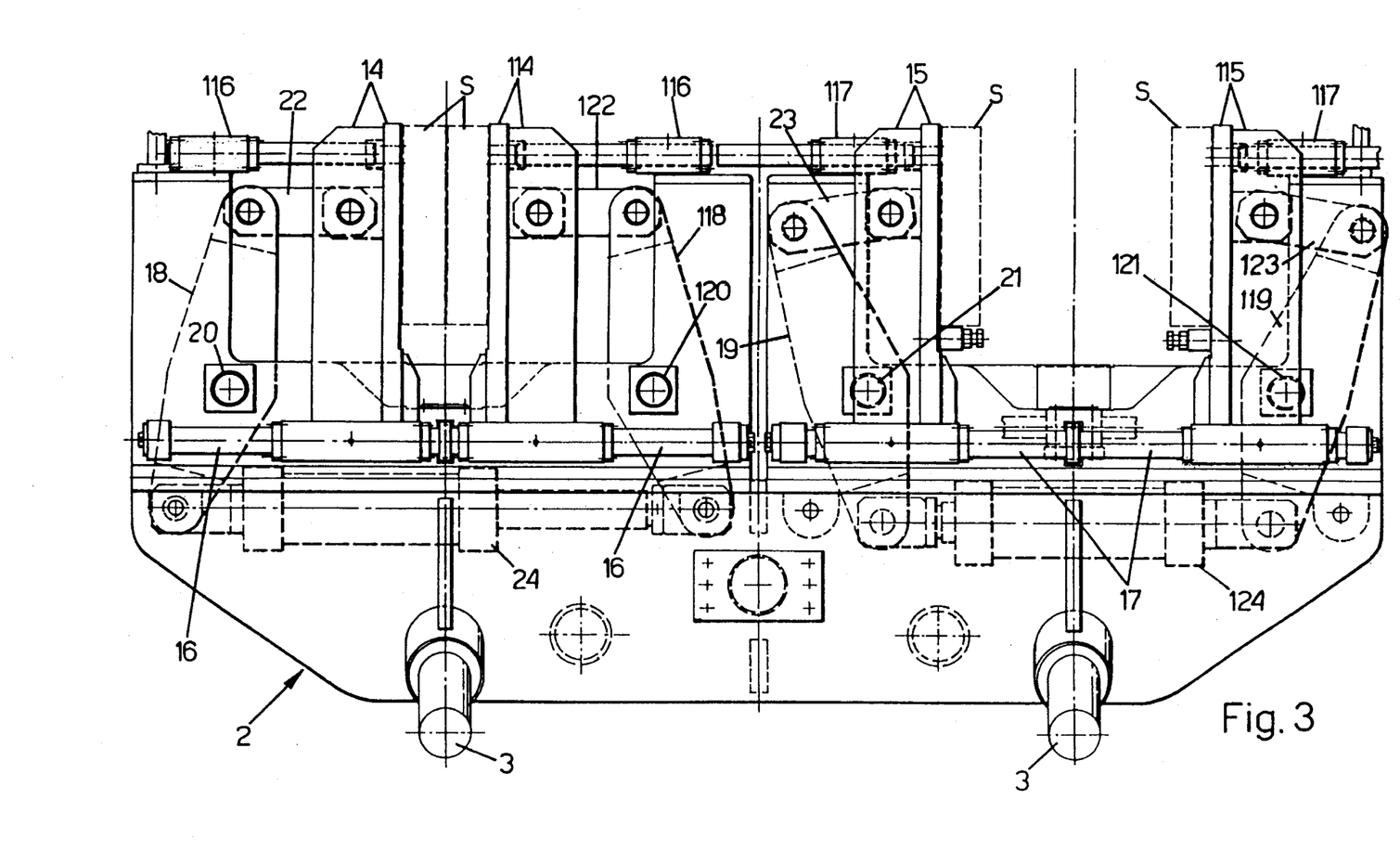
FIGS. 3 and 4 are front and side elevations, respectively, of the mould-carrying carriage.
Figure 4:
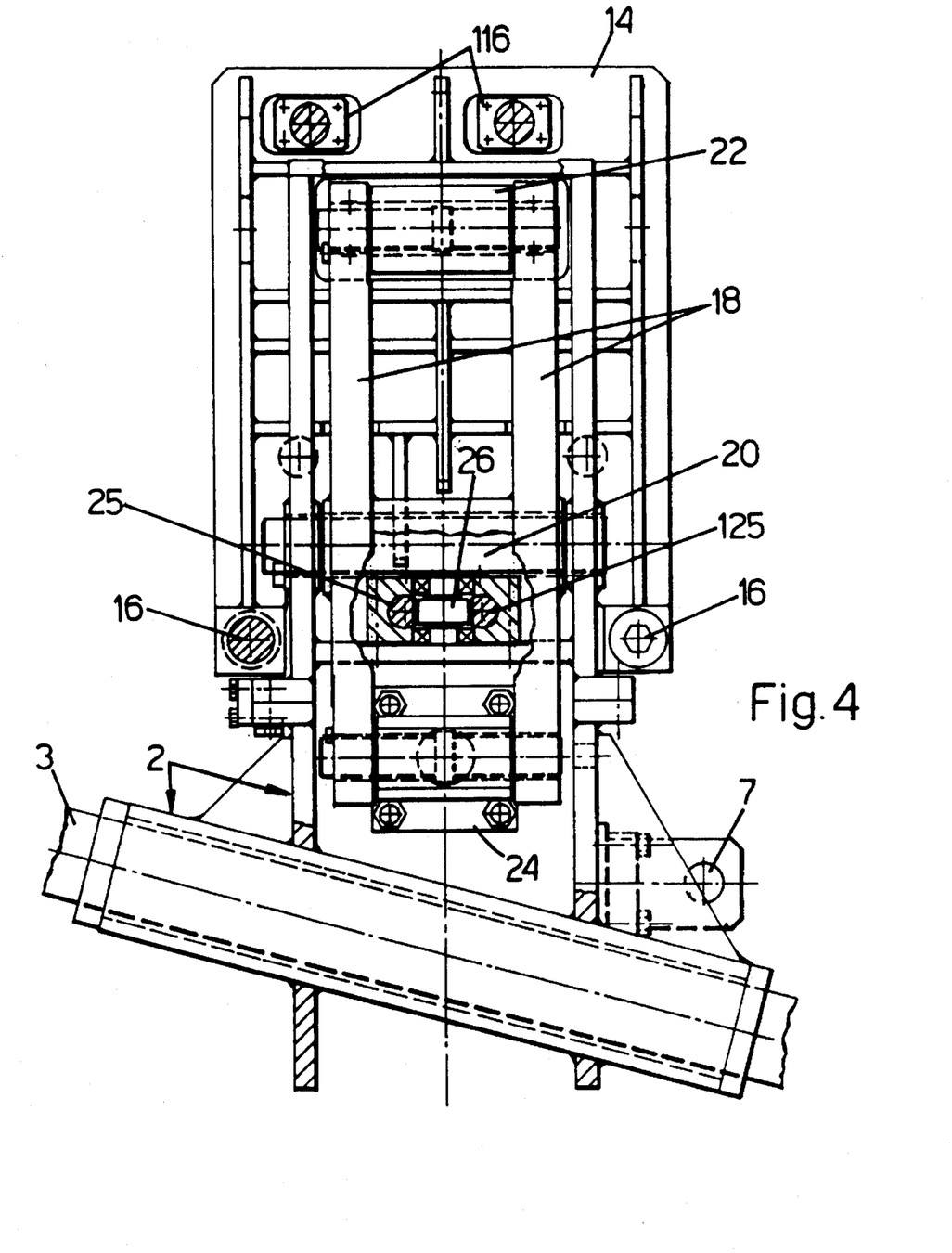

It can be seen in FIGS. 3 and 4 that there are mounted on the carriage 2 two adjacent pairs of mould-carrying slides 14-114 and 15-115 which slide on lower guides 16-17 and upper guides 116-117 and are opened and closed by corresponding pairs of levers 18-118 and 19-119 pivoting on the carriage 2 at 20-120 and 21-121, their upper ends being connected to the mould-carrying slides by means of link rods 22-122 and 23-123, while the lower ends of said levers are connected to two double-acting cylinder-and-piston units 24-124 powered by fluid pressure. The opening and closing movement of each pair of mould-carrying slides is synchronized and made self-centering by the engagement of racks 25-125 in each slide with a pinion 26 mounted so as to rotate on the carriage 2, as illustrated in the detail shown in FIG. 4.

The pairs of moulds S mounted on the slides 14-114 and 15-115 each carry more than one thermoforming cavity C. In the machine built by the applicant company, the cavities C of each pair of moulds are, for example, four in number, rather than two as illustrated by way of indication in the drawings.

When the carriage 2 is transferred to station 4, the moulds are in the position of maximum mutual separation or "opening" and so do not interfere with the parisons T of thermoplastic material gradually descending from the heads 113 connected to a single extruder 13. At station 4 special means, of which more later, position a label in each of the cavities C provided with known means for holding this label, which will later be fixed by heat welding to the thermoformed container in the mould complex concerned. When the labels have been fed in, the two pairs of moulds S close and capture between themselves within the opposing cavities C a parison T of predetermined length. Special known means, not shown here, then separate, by cutting, the parison captured between the moulds from the parison supplied by the extrusion heads, after which the carriage 2 is transferred in a combined movement of translation and lowering to station 5 where the blowing means, of known type, operate. These means comprise vertical rods 27 which are lowered at the right moment so that their blow pin 28 enters the top end of the plastic parisons captured between the moulds S in order to inflate these parisons and force them plastically to assume the shape of the container defined by the cavities C of the moulds, the abovementioned labels also being fixed to the formed container. The moulds S are suitably cooled in a known way by an internal forced circulation of liquid.

When the containers have been formed in the blowing station, the two pairs of moulds open in a self-centering movement while the thermoformed containers Z remain attached to and suspended from the now inactive blow pins 28, owing to thermal shrinking. The carriage 2 is then translated to station 4 to repeat the cycle just described.

Fixed to the front of the mould-carrying slides mounted on the carriage 2 are pairs of jaws 29-129 and 30-130 which, when the moulds close at station 4, close likewise at the blowing station 5 to grip the middles of the containers Z produced in the cycle described earlier and still attached to the blow pins 28 which at the right moment are raised with their rods 27. Then, when the carriage 22 moves from the loading station 4 to the blowing station 5, the grippers 29-129 and 30-130 transfer the thermoformed containers Z to a station 31 where special means of a known type remove from the containers the scrap or "flash" and open the mouths of these containers.

Before the grippers 29-120 and 30-130 open concomitantly with the repetition of a new cycle of blow thermoforming, the containers Z placed in station 31 are taken by the projecting jaws of trolley-mounted grippers of a known type 32-132 which then transfer the containers to conveyors 33-133 that unload them onto a single transverse discharging conveyor 34.

Figure 6:
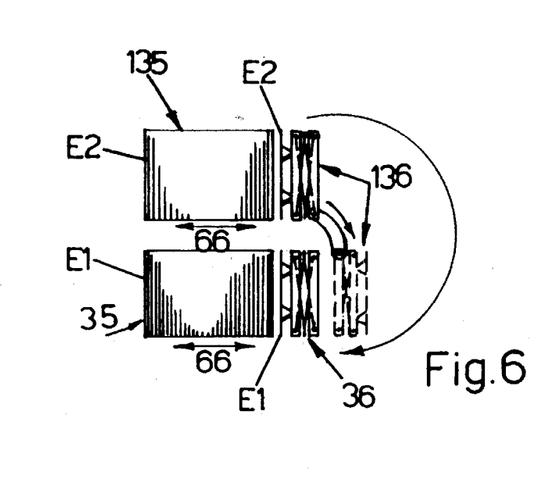
FIGS. 6 and 7 diagrammatically illustrate a labelling device located on the sides of the machine, in a front elevation and plan view respectively.
Figure 7:
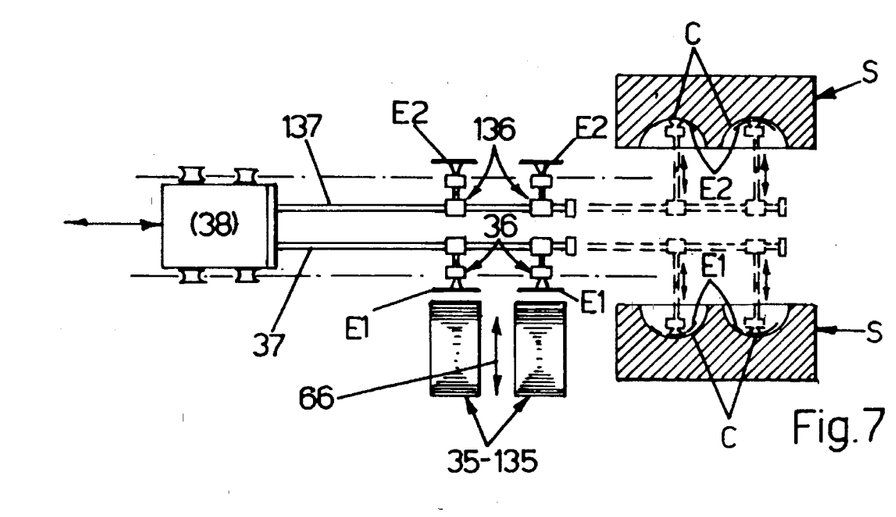

The problem that has chiefly occupied the designer in the construction of the machine according to the invention has without doubt been how to feed the labels to the cavities C of the two pairs of thermoforming moulds S standing in the loading station 4. In order that the label feed magazines can be easily inspected and cyclically refilled with labels, they have been located on the opposite sides of the machine, as diagrammatically shown in FIGS. 1, 2 and 6. On each side of the machine the label magazines 35-135 are ordered in two parallel rows; they are placed on different planes and the labels in one row of magazines are upside down relative to those in the other row. In a preferred embodiment, the labels E1 in the lower row of magazines 35 are the right way up, while the labels E2 in the upper magazines 135 are upside down. The lower labels E1 are taken by static grasping devices 36, while the upper labels E2 are taken by grasping devices 136 which then rotate downwards through 180° as shown in FIG. 6 in broken lines, coming parallel to the devices 36, with the labels E2 facing outwards and the right way up. FIG. 7 shows that the grasping devices 36-136, which are equal in number to the number of cavities C of each pair of moulds S, are carried by horizontal and parallel arms 37-137 projecting from a motorized guided carriage 38 which, when a command is received, is driven along a straight horizontal path to insert said devices between a pair of open moulds S, means being mounted on said carriage which through the arms 37-137 cause the devices 36-136 to approach the cavities C and place the labels E1–E2 therein, after which the same devices are withdrawn and carried back with the carriage to the start-of-cycle position, as depicted in FIG. 7 in both solid and broken lines.

With reference to FIGS. 8 to 14, further details will now be given concerning the construction and operation of the labelling devices discussed above in general terms and, for simplicity's sake, the description will be limited to just one of the two labelling devices located on the opposite sides of the machine, because these devices are alike.

Figure 8:
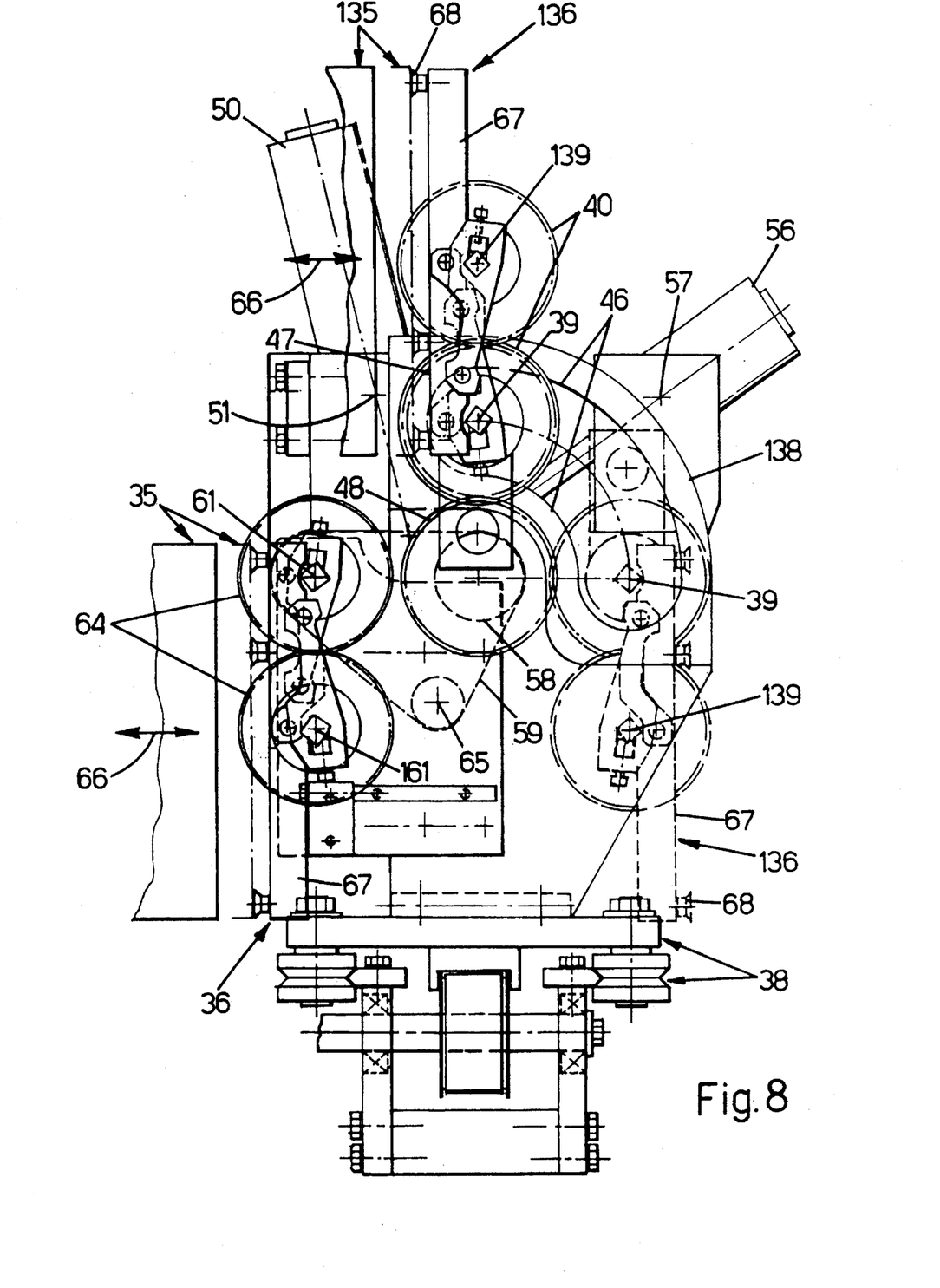
FIG. 8 is a front elevation of one of the labelling devices.
Figure 9:
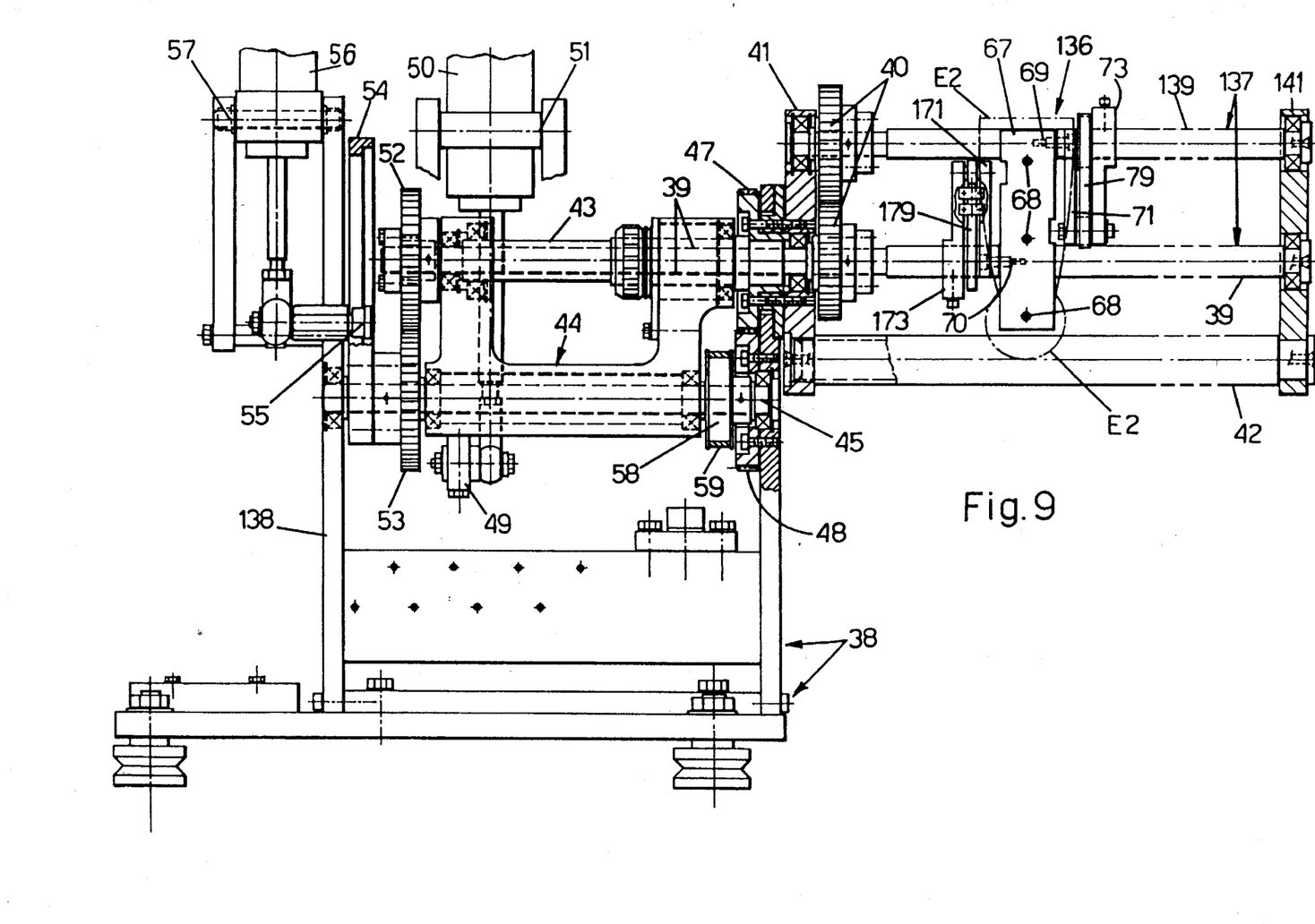
FIG. 9 is a side elevation with parts in section of the top part of a labelling device.
Figure 10:
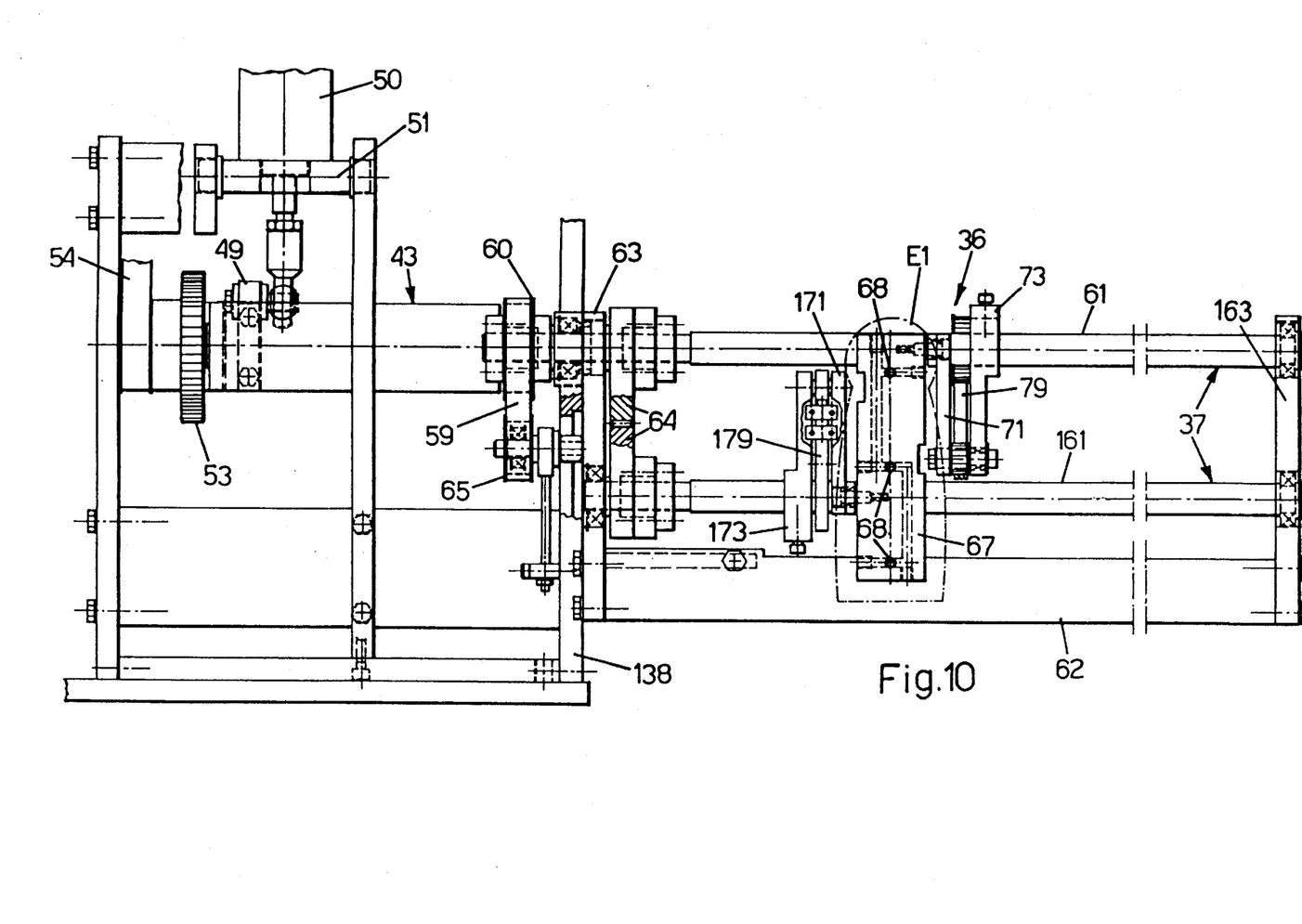
FIG. 10 is a side elevation with parts in section of the bottom part of a labelling device.

FIGS. 8 and 9 show that the arm 137 is formed by a pair of parallel shafts 39-139 of prismatic section synchronized by the gears 40 and supported rotatably at their ends by parallel plates 41-141 connected together by a member 42 parallel with the said shafts. Mounted on the prismatic shafts 39-139 are the devices for grasping the labels, which will be described below. In FIGS. 8 and 9, the labelling device served by the row of upper magazines 135 containing upside-down labels E2 is illustrated in solid lines in the raised position of engagement with these magazines and in this position the prismatic shafts 39-139 and the member 42 lie in a single vertical plane. The shaft 39 projects from the plate 41 and is enclosed rotatably in a sleeve 43 which in turn is supported rotatably by the ends of a bifurcated support 44, the latter being able to rotate on a shaft 45 which is parallel with said prismatic shafts and supported rotatably at its ends by the parallel end plates 138 of the carriage 38. The end plate 138 facing the prismatic shafts is provided with a slot 46 in the shape of a sector of a circle whose center is on the shaft 45, oriented downwards with an angular amplitude of 90° and through which passes the sleeve 43 and the body of a gear 47 rotating coaxially on the same sleeve but fixed to the plate 41. The gear 47 meshes with a gear 48 fixed to the end plate 138 of the carriage. The support 44 is connected by a little arm 49 to the rod of a double-acting cylinder-and-piston unit 50 powered by fluid pressure and attached by its body at 51 to a support integral with the carriage 38. With the intervention of the cylinder 50, the support 44 can be made to rotate through 90° about the shaft 45 in order to transfer the complex 39-139-40-41-141-42 from the top position of engagement with the upper magazines 135 to the bottom position indicated in FIGS. 6 and 8 in broken lines, adjacent to the labelling device served by the lower magazines 35 and described below. During the downward 90° rotation of the support 44, the gear 47 meshing with the fixed gear 48 executes a rotation of 180° and inverts the entire complex from 39 to 42, thereby correctly orienting the labels E2 taken upside down from the upper magazines 135.

In order to operate the label grasping devices, a command is sent to the prismatic shafts 39-139 which will then rotate by a precise amount in opposite directions, synchronization being ensured by the gears 40. To enable this rotation to take place, the shaft 39 projects from the sleeve 43 and a gear 52 fitted to its end meshes with a gear 53 fitted to the shaft 45 and attached to a slotted arm 54 connected through the block 55 to the rod of a cylinder-and-piston unit 56 attached at 57 to a support fixed to the carriage 38. Modifications to the distance between the block 55 and the shaft 45 also modify the amplitude of rotation transmitted to the prismatic shafts, so adapting the size of the displacement of the label-grasping devices to the different depths of the mould cavities C (see below). It can furthermore be seen in FIG. 9 that there is fitted to the shaft 45 a toothed pulley 58 which through the toothed belt 59 drives an identical pulley 60 fitted to the end of the prismatic shaft 61 of the labelling device served by the lower row of magazines 35 containing the upright labels E1 (see FIGS. 6, 7, 8 and 10). These figures show that in this device too the arm 37 is formed by a pair of parallel prismatic shafts 61-161 positioned in a vertical plane together with the member 62 that connects together the parallel plates 63-163 which support said shafts rotatably, plate 63 being fixed to the frontmost end plate 138 of the carriage 38. In the same way the shafts 61-161 are synchronized by gears 64. The reference 65 denotes the belt 59 tensioner.

The magazines 35-135 are mounted on a single displacement apparatus indicated diagrammatically by the arrows 66 which on command moves these magazines towards and away from the labelling devices discussed above in order to feed one label at a time to them.

Figure 11:
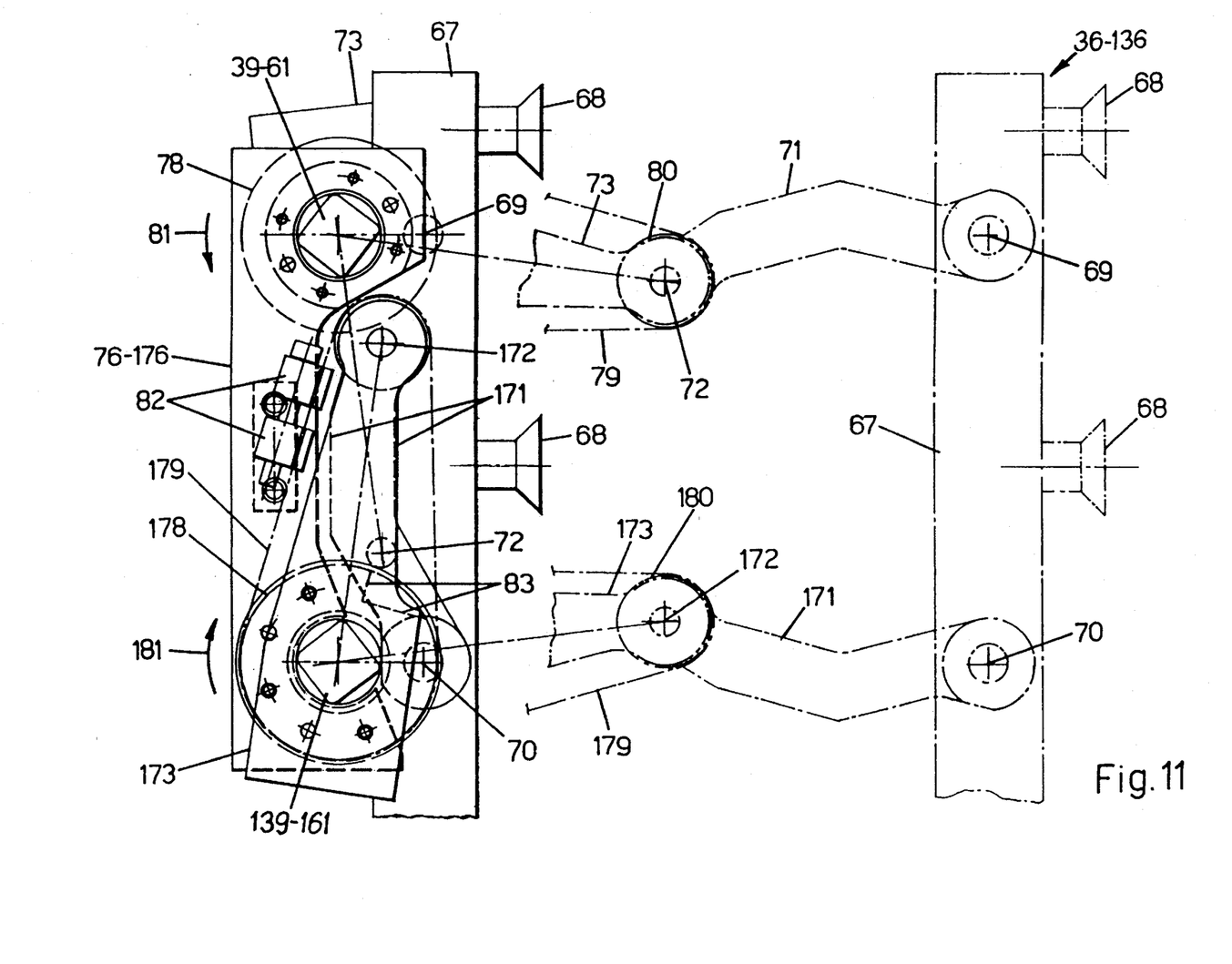
FIG. 11 is an enlarged side view of a label grasping unit of a labelling device.
Figure 12:
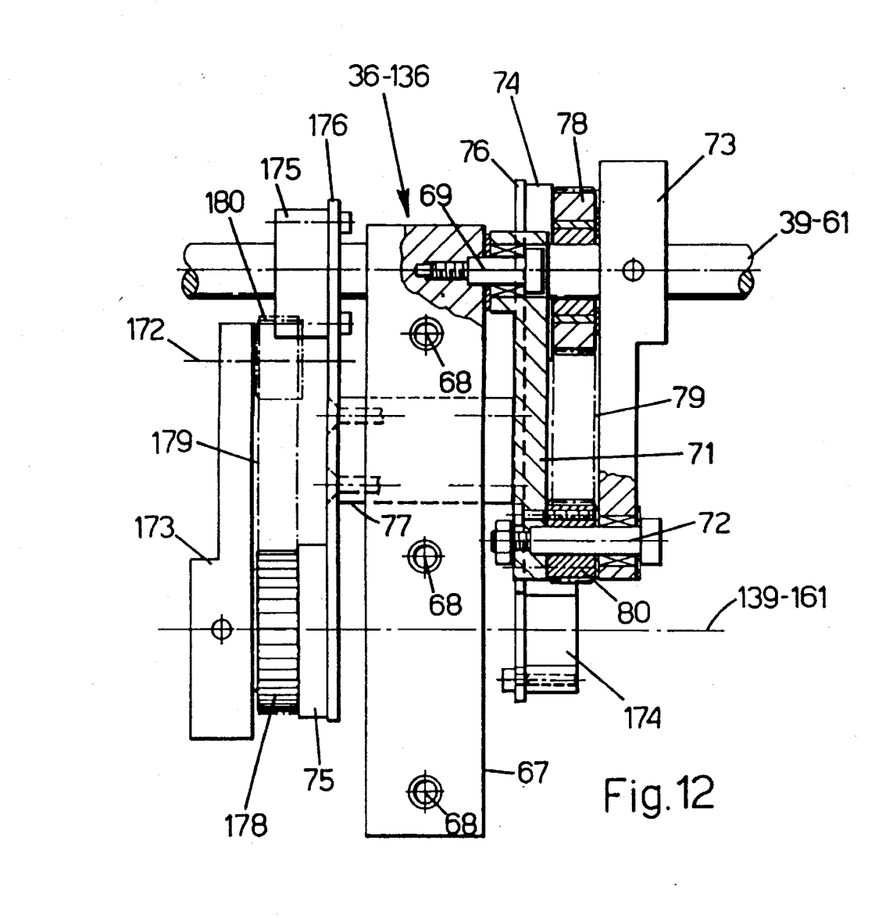
FIG. 12 is a front elevation with parts in section of the label grasping unit shown in the previous figure.
Figure 13:
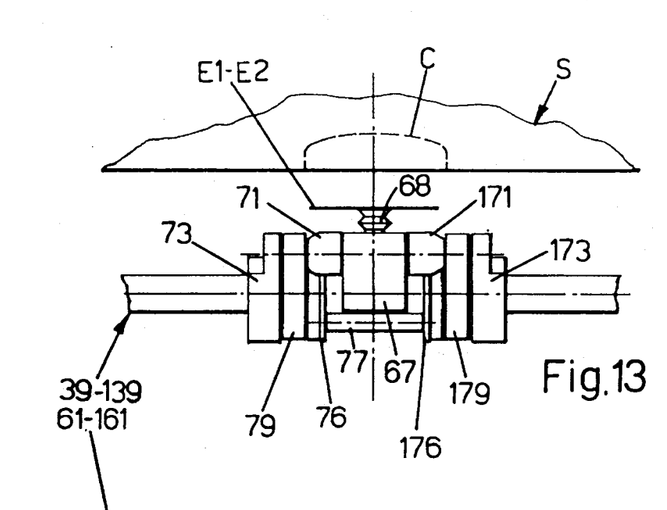
FIGS. 13–14 show the label grasping unit in a plan view from above in the steps of, respectively, insertion between the moulds and feeding the label into the cavities of said moulds.
Figure 14:
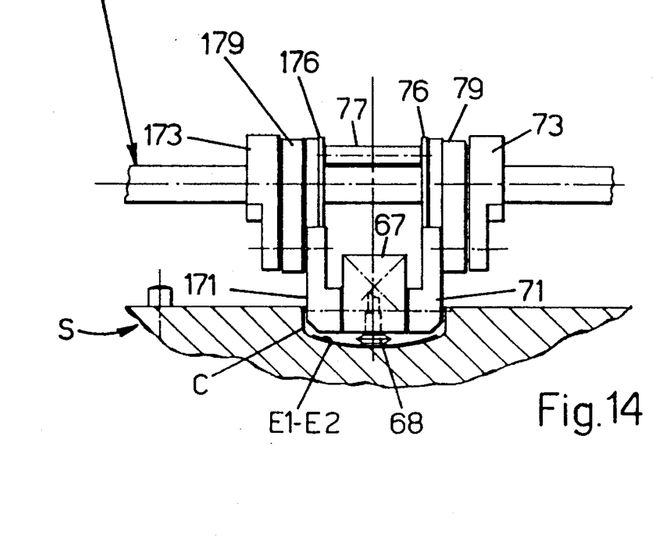

The label grasping devices 36-136 mounted on the aforesaid pairs of prismatic shafts are identical, so for the sake of simplicity only one will be described here. As shown in FIGS. 8, 9, 10 and 11, each label grasping device comprises a vertical bar 67 carrying, on its external front, suckers 68 connected to a suction circuit (not shown). At the points marked 69 and 70 the opposite sides of the bar 67 pivot on identical forearms 71-171 which in turn are connected by cylindrical pivots 72-172 to identical arms 73-173 fitted on the prismatic shafts of the labelling device. As shown in the details of FIGS. 11 and 12, the same prismatic shafts pass rotatably through the end bushes 74-174 and 75-175 of a pair of plates 76-176 connected together by a cross piece 77 and resting against the arms 73-173, at which point identical toothed pulleys 78-178 are fitted on each of the bushes 74-75 of these plates. Around each of these pulleys pass toothed belts 79-179 which engage with corresponding smaller toothed pulleys 80-180 fixed to the ends of the forearms 71-171 that pivot at 72-172 on the arms 73-173. It is clear from FIG. 11 how, as a result of the synchronized rotation of the prismatic shafts in the directions indicated by the arrows 81-181, the arms 73-173 rotate and reach forwards and outwards from these shafts with an equal angular movement, while the forearms 71-171 rotate and move away from said arms with an equal angular movement determined by the engagement of the smaller pivot pulleys 80-180 with the fixed pulleys 78-178 by means of the belts 79-179. The suction bar 67 accordingly executes a translational movement and remains in a vertical position, transferring the labels E1 or E2 correctly to the insides of the cavities C of the pairs of moulds S, as shown by the sequence illustrated in FIGS. 13 and 14. With a contrary rotation to that indicated above of the prismatic shafts, the bar 67 is withdrawn to the shafts and is made ready to take new labels from the feed magazines. It will be understood that the pulleys 78-178-80-180 and belts 79-179 can be replaced by articulated parallelogram-type levers cooperating with the fixed plates 76-176 with the forearms 71-171 and with the bar 67 to ensure the verticality and the horizontal displacement of said bar 67: these things will be immediately clear to those skilled in the art and will be easy to construct.

In FIG. 11 the numeral 82 indicates an end-of-travel block mounted on the toothed belts 79-179 which, in the position of maximum extension of the bar 67, engages in a recess 83 provided in the fixed pulleys 78-178.

I claim:

1. Apparatus for blow thermoforming of hollow articles or containers using thermoplastic material, said apparatus adapted to provide a high-output of said hollow articles or containers to a scrap removal station and subsequently to a single transverse discharging conveyor, said apparatus comprising:

a base;

a parison loading station mounted on said base;

a blowing station mounted on said base;

a single carriage mounted on said base and being movable alternately to and from said loading station and said blowing station;

at least two adjacent pairs of moulds mounted on said carriage and provided with means for self-centering and means for opening and closing the moulds;

a plurality of label magazines associated with said parison loading station, at least two of said label magazines per pair of moulds being mounted in parallel rows on an outer side of said base, one lower row being below an upper row such that the magazines can be easily inspected and periodically filled with labels, and wherein labels are positioned differently in said upper magazine row than in said lower magazine row; and a label grasping and transferring means for each pair of moulds which is associated with said parison loading station and mounted on said base, said label grasping and transferring means being designed to take labels from said parallel rows of magazines and change the relative position of the labels to position them in the orientation required for introduction into the moulds at said parison loading station.

2. Apparatus in accordance with claim 1 wherein the magazines are mounted for movement towards and away from the label grasping and transferring means, the lower row of magazines is loaded with labels which are right-side up relative to the respective mould and the upper row of magazines is loaded with labels which are upside-down relative to the respective mould; and wherein said label grasping and transferring means comprises a first grasping means and second grasping means, said first grasping means being adapted to take labels from the upper row of magazines and being provided with means for rotating said first grasping means 180° downwardly about the longitudinal axis of said label grasping and transferring means in order to position the first label grasping means parallel with and adjacent to the second label grasping means which is adapted to take labels from the lower row of magazines, such that grasped labels are positioned upright and facing each other for insertion into respective moulds.

3. Apparatus in accordance with claim 1 wherein the label grasping and transferring means comprises a first grasping means adapted to take labels from the upper row of magazines and a second grasping means being adapted to take labels from the lower row of magazines; said first grasping means being mounted on a structure which is supported cantilever-fashion for rotation about a first axis parallel to a longitudinal axis of said structure by a support mounted on the carriage and which pivots about a pivot axis parallel to said first axis; said support being pivotable about its pivot axis by virtue of a double-acting cylinder-and-piston unit mounted on the carriage and operated by fluid pressure, the degree of rotation being sufficient to transfer the first grasping means from a position where it engages the upper row of magazines to a lower position adjacent the second grasping means; and said apparatus further comprising a first gear fixed to said structure in a manner whereby said first gear is coaxial with a pivot of said pivotable support, and a second gear mounted coaxially and rotatably on said support to mesh with said first gear such that when said support is pivoted about its pivot axis, the first grasping means is rotated 180° about its longitudinal axis to a position where said first grasping means faces said second grasping means, whereby the labels are oriented for insertion into the respective moulds by moving the labeling and transferring means between corresponding pairs of moulds.

4. Apparatus according to claim 1 wherein said label grasping and transferring means comprises first and second grasping devices, each of which includes a bar with a front, a back, two sides and label-grasping suckers mounted on the front; each bar being connected at two offset points on opposite sides thereof to ends of first and second forearms, said first and second forearms being connected by a cylindrical pivot to respective third and fourth forearms which are fitted on a pair of parallel prismatic shafts that are supported rotatably at the ends by two parallel plates including pairs of aligned portals through which said prismatic shafts extend; the rotation of said prismatic shafts being synchronized by contra-rotating gears mounted on said shafts in intermeshing relationship with each other, one of said gears being connected to a centralized rotational unit mounted on said base; there being provided between each pair of arms, a pair of plates connected to each other and having bushes at their ends through which said prismatic shafts pass and in which said shafts may rotate; and there being fitted to the bushes, in close proximity to where said third and fourth forearms are fitted to the shafts, fixed toothed pulley devices which, by way of toothed belt devices in engagement therewith, are connected to smaller toothed pulley devices fitted to the ends of said first and second forearms opposite the ends which are pivotally connected to said third and fourth forearms, such that contra-rotation of said prismatic shafts causes the bars with the label grasping suckers to move towards and away from said shafts by moving perpendicular to the vertical plane in which the shafts lie.

5. Apparatus according to claim 1 wherein said grasping and transferring means comprises first and second grasping devices each of which are fitted on a respective pair of parallel prismatic shafts that are supported rotatably at the ends by respective pairs of parallel plates including pairs of aligned portals through which said prismatic shafts extend; and wherein one of the prismatic shafts of the first grasping devices projects from one of the supporting parallel plates and passes axially and rotatably through a sleeve supported rotatably by a support which is mounted for pivotal movement and, on command, pivots 90° about a pivot, and wherein said shaft further projects from said sleeve and carries a first gear which meshes with a second gear mounted for rotational movement on the pivot of said support and which is connected to a lever mounted for a variable angular movement on a double-acting cylinder-and-piston unit which is operated by fluid pressure, and which lever, via a positive transmission device transmits the rotation of the end of said one prismatic shaft to the end of a prismatic shaft of said second grasping means.

6. Apparatus according to claim 4 further comprising adjustable stop pieces mounted on each of said toothed belt devices, which stop pieces engage with recesses provided in said fixed toothed pulley means for adjusting the distance traveled by said bars towards the interior of said moulds.

* * * * *